US010152967B2

(12) United States Patent
Vilermo et al.

(10) Patent No.: US 10,152,967 B2
(45) Date of Patent: Dec. 11, 2018

(54) DETERMINATION OF AN OPERATIONAL DIRECTIVE BASED AT LEAST IN PART ON A SPATIAL AUDIO PROPERTY

(71) Applicant: Nokia Technologies Oy, Espoo (FI)

(72) Inventors: Miikka Vilermo, Siuro (FI); Arto Lehtiniemi, Lempäälä (FI); Lasse Laaksonen, Tampere (FI); Mikko Tammi, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 15/117,232

(22) PCT Filed: Feb. 12, 2015

(86) PCT No.: PCT/FI2015/050086
§ 371 (c)(1),
(2) Date: Aug. 8, 2016

(87) PCT Pub. No.: WO2015/124831
PCT Pub. Date: Aug. 27, 2015

(65) Prior Publication Data
US 2016/0351191 A1 Dec. 1, 2016

(30) Foreign Application Priority Data

Feb. 19, 2014 (EP) ..................... 14155674

(51) Int. Cl.
*G10L 15/22* (2006.01)
*G06F 3/16* (2006.01)
*G10L 15/08* (2006.01)

(52) U.S. Cl.
CPC .............. *G10L 15/22* (2013.01); *G06F 3/167* (2013.01); *G10L 15/08* (2013.01);
(Continued)

(58) Field of Classification Search
CPC ... G10L 15/22; G10L 15/08; G10L 2015/088; G10L 2015/223; G10L 2015/226; G06F 3/167
(Continued)

(56) References Cited

U.S. PATENT DOCUMENTS

| 6,707,910 B1 * | 3/2004 | Valve | G10L 25/78 342/423 |
| 8,447,605 B2 * | 5/2013 | Inagaki | G10L 15/10 704/216 |

(Continued)

FOREIGN PATENT DOCUMENTS

| EP | 2187656 A1 * | 5/2010 | .............. H04R 1/406 |
| GB | 2394589 A * | 4/2004 | .............. G01L 15/26 |

(Continued)

OTHER PUBLICATIONS

International Search Report and Written Opinion received for corresponding Patent Cooperation Treaty Application No. PCT/FI2015/050086, dated Apr. 28, 2015, 10 pages.
(Continued)

*Primary Examiner* — Edwin S Leland, III
(74) *Attorney, Agent, or Firm* — Banner & Witcoff, Ltd.

(57) ABSTRACT

A method comprising receiving audio information by way of a plurality of microphones comprised by an apparatus, determining at least one spatial audio property of the audio information in relation to the apparatus, determining an operational directive based, at least in part, on the spatial audio property, and performing one or more operations in conformance with the operational directive is disclosed.

19 Claims, 8 Drawing Sheets

(52) U.S. Cl.
CPC .. *G10L 2015/088* (2013.01); *G10L 2015/223* (2013.01); *G10L 2015/226* (2013.01)

(58) Field of Classification Search
USPC .......................................................... 704/251
See application file for complete search history.

(56) References Cited

U.S. PATENT DOCUMENTS

| | | | | |
|---|---|---|---|---|
| 9,251,787 | B1* | 2/2016 | Hart | G10L 15/22 |
| 9,338,761 | B2* | 5/2016 | Ur | H04M 19/04 |
| 9,431,021 | B1* | 8/2016 | Scalise | G10L 21/00 |
| 9,911,416 | B2* | 3/2018 | Yun | G10L 15/22 |
| 2008/0140400 | A1* | 6/2008 | Blass | G10L 15/22 704/246 |
| 2010/0022183 | A1* | 1/2010 | Ryle | H04H 20/33 455/3.06 |
| 2012/0069986 | A1* | 3/2012 | Edholm | H04M 3/2281 379/265.06 |
| 2012/0259638 | A1* | 10/2012 | Kalinli | G10L 15/25 704/270 |
| 2013/0297319 | A1* | 11/2013 | Kim | G10L 15/22 704/275 |
| 2016/0057522 | A1* | 2/2016 | Choisel | H04R 1/08 381/92 |
| 2016/0139241 | A1* | 5/2016 | Holz | H04B 17/318 367/128 |
| 2016/0223640 | A1* | 8/2016 | Vilermo | G01S 5/0284 |
| 2016/0284350 | A1* | 9/2016 | Yun | G10L 15/22 |
| 2016/0321848 | A1* | 11/2016 | Ricci | H04W 4/21 |
| 2016/0351191 | A1* | 12/2016 | Vilermo | G10L 15/22 |

FOREIGN PATENT DOCUMENTS

| | | |
|---|---|---|
| JP | 2009-020423 A | 1/2009 |
| JP | 2010-204266 A | 9/2010 |
| JP | 2010-217754 A | 9/2010 |
| WO | 2013/072554 A3 | 5/2013 |
| WO | 2013/079781 A1 | 6/2013 |
| WO | 2013/079782 A1 | 6/2013 |
| WO | 2014/024009 A1 | 2/2014 |

OTHER PUBLICATIONS

"Multilateration", Wikipedia, Retrieved on Oct. 5, 2016, Webpage available at : http://en.wikipedia.org/wiki/TDOA.
"Microsoft Invents Voice-Controlled Camera for Windows Phone", Patently Mobile, Retrieved on Oct. 5, 2016, Webpage available at : http://www.patentlymobile.com/2013/05/microsoft-invents-voice-controlled-camera-for-windows-phone.html.
Nakadai et al., "Sound Source Tracking With Directivity Pattern Estimation Using A 64 Ch Microphone Array", IEEE/RSJ International Conference on Intelligent Robots and Systems, Aug. 2-6, 2005, 7 pages.
Farnsworth, "Radiation Pattern of the Human Voice", Nature, No. 3811, Nov. 14, 1942, pp. 583-583.
Extended European Search Report received for corresponding European Patent Application No. 14155674.6, dated Aug. 4, 2014, 7 pages.
Office action received for corresponding European Patent Application No. 14155674.6, dated Aug. 30, 2016, 5 pages.
Nov. 28, 2017 (JP) Japanese Office Action—App 2016-553021.
Aug. 28, 2018—(JP) Decision of Final Rejection—App 2016-553021.

* cited by examiner

| Distance 401 | Operational Directive 403 |
|---|---|
| Distance 404 | Operational Directive 406 |
| Distance 407 | Operational Directive 409 |

FIG. 4A

| Direction 411 | Operational Directive 413 |
|---|---|
| Direction 414 | Operational Directive 416 |
| Direction 417 | Operational Directive 419 |

FIG. 4B

| Distance 421 | Direction 422 | Operational Directive 423 |
|---|---|---|
| Distance 421 | Direction 424 | Operational Directive 425 |
| Distance 426 | Direction 422 | Operational Directive 427 |

FIG. 4C

DETERMINATION OF AN OPERATIONAL DIRECTIVE BASED AT LEAST IN PART ON A SPATIAL AUDIO PROPERTY

RELATED APPLICATION

This application was originally filed as Patent Cooperation Treaty Application No. PCT/FI2015/050086 filed Feb. 12, 2015 which claims priority benefit to European Patent Application No. 14155674.6, filed Feb. 19, 2014.

TECHNICAL FIELD

The present application relates generally to determination of an operational directive.

BACKGROUND

Electronic apparatuses, such as mobile communication apparatuses, are becoming more and more versatile. Apparatuses can perform numerous functions and a user can provide inputs that will cause an apparatus to take desired actions or change its behavior based on the inputs. It may be desirable for user input associated with an apparatus to be convenient for the user. It may also be desirable to design the apparatus so that the apparatus does what the user wants it to do in response to input from the user. In such circumstances, it may be desirable to allow a user to invoke operations on the apparatus in simple and intuitive manner.

SUMMARY

Various aspects of examples of the invention are set out in the claims.

One or more embodiments may provide an apparatus, a computer readable medium, a non-transitory computer readable medium, a computer program product, and a method for receiving audio information by way of a plurality of microphones comprised by an apparatus, determining at least one spatial audio property of the audio information in relation to the apparatus, determining an operational directive based, at least in part, on the spatial audio property, and performing one or more operations in conformance with the operational directive.

One or more embodiments may provide an apparatus, a computer readable medium, a computer program product, and a non-transitory computer readable medium having means for receiving audio information by way of a plurality of microphones comprised by an apparatus, means for determining at least one spatial audio property of the audio information in relation to the apparatus, means for determining an operational directive based, at least in part, on the spatial audio property, and means for performing one or more operations in conformance with the operational directive.

One or more embodiments may provide an apparatus comprising at least one processor and at least one memory, the memory comprising machine-readable instructions, that when executed cause the apparatus to perform receipt of audio information by way of a plurality of microphones comprised by an apparatus, determination of at least one spatial audio property of the audio information in relation to the apparatus, determination of an operational directive based, at least in part, on the spatial audio property, and performance of one or more operations in conformance with the operational directive.

In at least one example embodiment, the audio information is voice information.

In at least one example embodiment, the voice information is audio information that comprises an audio representation of speech.

One or more example embodiments further perform determination that the audio information is voice information.

In at least one example embodiment, receipt of the audio information by way of the plurality of microphones comprises receipt of a first audio information by way of a first microphone, and receipt of a second audio information by way of a second microphone, such that the audio information is indicated by both the first audio information and the second audio information.

In at least one example embodiment, determination of the spatial audio property is based, at least in part, on comparison of the first audio information and the second audio information.

In at least one example embodiment, the comparison comprises identifying a signal time difference between the first audio information and the second audio information.

In at least one example embodiment, the comparison comprises identifying a signal attenuation difference between the first audio information and the second audio information.

In at least one example embodiment, the spatial audio property is at least one of an audio direction with respect to the apparatus, or an audio distance from the apparatus.

In at least one example embodiment, the audio direction is a direction of an audio path between the apparatus and a source of the audio information.

In at least one example embodiment, the audio distance is a distance along an audio path between the apparatus and a source of the audio information.

In at least one example embodiment, determination of the operational directive comprises determination that the spatial audio property is within a spatial audio property operation threshold, wherein determination of the operational directive is based, at least in part, on the determination that the spatial audio property is within the spatial audio property operation threshold.

In at least one example embodiment, the spatial audio property operation threshold is a predetermined range of spatial audio properties such that a spatial audio property within the predetermined range allows for determination of one or more operational directives.

In at least one example embodiment, the spatial audio property operation threshold is a predetermined range of spatial audio properties such that a spatial audio property beyond the predetermined range precludes determination of one or more operational directives.

In at least one example embodiment, the audio information comprises voice command audio information, determination of the operational directive comprises identification of a voice command based, at least in part, on the voice command audio information, and the determination of the operational directive is based, at least in part, on the voice command.

In at least one example embodiment, the voice command audio information is absent information indicative of a voice command prompt, and identification of the voice command is based, at least in part, on the determination that the spatial audio property is within the spatial audio property operation threshold.

One or more example embodiments further perform receipt of different audio information by way of the plurality of microphones, determination of at least one different spatial audio property of the different audio information in relation to the apparatus, determination that the spatial audio property is beyond a spatial audio property operation threshold, and preclusion of determination of another operational directive based, at least in part, on the determination that the spatial audio property is beyond the spatial audio property operation threshold.

In at least one example embodiment, the spatial audio property operation threshold is a predetermined range of directions that corresponds with an audio source being directed towards the apparatus.

In at least one example embodiment, the spatial audio property operation threshold is a predetermined range of distances that corresponds with an audio source being proximate to the apparatus.

In at least one example embodiment, the spatial audio property operation threshold is at least one of a directional audio property operation threshold or a distance audio property operation threshold.

In at least one example embodiment, the operational directive is a directive that instructs the apparatus to perform a particular set of operations that are associated with the directive.

In at least one example embodiment, the operational directive identifies at least one operation of the set of operations.

In at least one example embodiment, the audio information comprises voice command audio information, determination of the operational directive comprises identification of a voice command based, at least in part, on the voice command audio information, and the determination of the operational directive is based, at least in part, on the voice command.

One or more example embodiments further perform receipt of different audio information, which comprises other voice command audio information, by way of the plurality of microphones, determination of at least one different spatial audio property of the different audio information in relation to the apparatus, the different spatial audio property being different from the spatial audio property, identification of the voice command based, at least in part, on the other voice command audio information, determination of a different operational directive based, at least in part, on the different spatial audio property and the voice command, and performance of one or more different operations in conformance with the different operational directive.

One or more example embodiments further perform causation of display of a spatial audio operation indicator that is a visual representation of correlation between a plurality of spatial audio property ranges and a plurality of operational directive candidates.

In at least one example embodiment, the plurality of spatial audio property ranges includes the spatial audio property and the plurality of operational directive candidates includes the operational directive.

In at least one example embodiment, the visual representation indicates a plurality of directions such that the plurality of operational directive candidates are represented in correspondence with respective directions associated with the operational directive candidates.

In at least one example embodiment, the visual representation indicates a plurality of distances such that the plurality of operational directive candidates are represented in correspondence with respective distances associated with the operational directive candidates.

In at least one example embodiment, the operational directive indicates operations that are independent of processing of the audio information.

In at least one example embodiment, the operational directive corresponds with operations associated with transmission of the audio information to a separate apparatus.

In at least one example embodiment, the operational directive corresponds with operations associated with preclusion of transmission of the audio information to a separate apparatus.

BRIEF DESCRIPTION OF THE DRAWINGS

For a more complete understanding of embodiments of the invention, reference is now made to the following descriptions taken in connection with the accompanying drawings in which:

FIGS. 4A-4C are diagrams illustrating correlation between a spatial audio property and an operational directive according to at least one example embodiment;

DETAILED DESCRIPTION OF THE DRAWINGS

Figure 1:
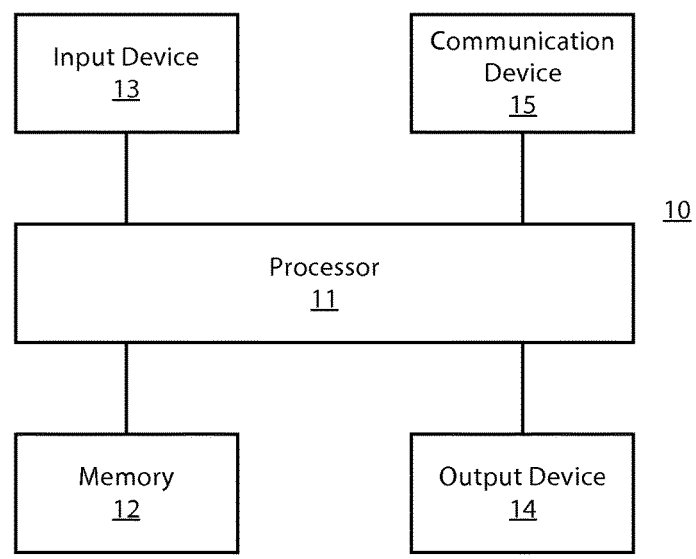
FIG. 1 is a block diagram showing an apparatus according to an example embodiment.

An embodiment of the invention and its potential advantages are understood by referring to FIGS. 1 through 8B of the drawings.

Some embodiments will now be described more fully hereinafter with reference to the accompanying drawings, in which some, but not all, embodiments are shown. Various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network apparatus, other network apparatus, and/or other computing apparatus.

As defined herein, a "non-transitory computer-readable medium," which refers to a physical medium (e.g., volatile or non-volatile memory device), can be differentiated from a "transitory computer-readable medium," which refers to an electromagnetic signal.

FIG. 1 is a block diagram showing an apparatus, such as an electronic apparatus 10, according to at least one example embodiment. It should be understood, however, that an electronic apparatus as illustrated and hereinafter described is merely illustrative of an electronic apparatus that could benefit from embodiments of the invention and, therefore, should not be taken to limit the scope of the invention. While electronic apparatus 10 is illustrated and will be hereinafter described for purposes of example, other types of electronic apparatuses may readily employ embodiments of the invention. Electronic apparatus 10 may be a personal digital assistant (PDAs), a pager, a mobile computer, a desktop computer, a television, a gaming apparatus, a laptop computer, a tablet computer, a media player, a camera, a video recorder, a wearable apparatus, a head mounted apparatus, a see through display apparatus, a mobile phone, a global positioning system (GPS) apparatus, an automobile, a kiosk, an electronic table, and/or any other types of electronic systems. Moreover, the apparatus of at least one example embodiment need not be the entire electronic apparatus, but may be a component or group of components of the electronic apparatus in other example embodiments. For example, the apparatus may be an integrated circuit, a set of integrated circuits, and/or the like.

Furthermore, apparatuses may readily employ embodiments of the invention regardless of their intent to provide mobility. In this regard, even though embodiments of the invention may be described in conjunction with mobile applications, it should be understood that embodiments of the invention may be utilized in conjunction with a variety of other applications, both in the mobile communications industries and outside of the mobile communications industries. For example, the apparatus may be, at least part of, a non-carryable apparatus, such as a large screen television, an electronic table, a kiosk, an automobile, and/or the like.

In at least one example embodiment, electronic apparatus 10 comprises processor 11 and memory 12. Processor 11 may be any type of processor, controller, embedded controller, processor core, and/or the like. In at least one example embodiment, processor 11 utilizes computer program code to cause an apparatus to perform one or more actions. Memory 12 may comprise volatile memory, such as volatile Random Access Memory (RAM) including a cache area for the temporary storage of data and/or other memory, for example, non-volatile memory, which may be embedded and/or may be removable. The non-volatile memory may comprise an EEPROM, flash memory and/or the like. Memory 12 may store any of a number of pieces of information, and data. The information and data may be used by the electronic apparatus 10 to implement one or more functions of the electronic apparatus 10, such as the functions described herein. In at least one example embodiment, memory 12 includes computer program code such that the memory and the computer program code are configured to, working with the processor, cause the apparatus to perform one or more actions described herein.

The electronic apparatus 10 may further comprise a communication device 15. In at least one example embodiment, communication device 15 comprises an antenna, (or multiple antennae), a wired connector, and/or the like in operable communication with a transmitter and/or a receiver. In at least one example embodiment, processor 11 provides signals to a transmitter and/or receives signals from a receiver. The signals may comprise signaling information in accordance with a communications interface standard, user speech, received data, user generated data, and/or the like. Communication device 15 may operate with one or more air interface standards, communication protocols, modulation types, and access types. By way of illustration, the electronic communication device 15 may operate in accordance with second-generation (2G) wireless communication protocols IS-136 (time division multiple access (TDMA)), Global System for Mobile communications (GSM), and IS-95 (code division multiple access (CDMA)), with third-generation (3G) wireless communication protocols, such as Universal Mobile Telecommunications System (UMTS), CDMA2000, wideband CDMA (WCDMA) and time division-synchronous CDMA (TD-SCDMA), and/or with fourth-generation (4G) wireless communication protocols, wireless networking protocols, such as 802.11, short-range wireless protocols, such as Bluetooth, and/or the like. Communication device 15 may operate in accordance with wireline protocols, such as Ethernet, digital subscriber line (DSL), asynchronous transfer mode (ATM), and/or the like.

Processor 11 may comprise means, such as circuitry, for implementing audio, video, communication, navigation, logic functions, and/or the like, as well as for implementing embodiments of the invention including, for example, one or more of the functions described herein. For example, processor 11 may comprise means, such as a digital signal processor device, a microprocessor device, various analog to digital converters, digital to analog converters, processing circuitry and other support circuits, for performing various functions including, for example, one or more of the functions described herein. The apparatus may perform control and signal processing functions of the electronic apparatus 10 among these devices according to their respective capabilities. The processor 11 thus may comprise the functionality to encode and interleave message and data prior to modulation and transmission. The processor 1 may additionally comprise an internal voice coder, and may comprise an internal data modem. Further, the processor 11 may comprise functionality to operate one or more software programs, which may be stored in memory and which may, among other things, cause the processor 11 to implement at least one embodiment including, for example, one or more of the functions described herein. For example, the processor 11 may operate a connectivity program, such as a conventional internet browser. The connectivity program may allow the electronic apparatus 10 to transmit and receive internet content, such as location-based content and/or other web page content, according to a Transmission Control Protocol (TCP), Internet Protocol (IP), User Datagram Protocol (UDP), Internet Message Access Protocol (IMAP), Post Office Protocol (POP), Simple Mail Transfer Protocol (SMTP), Wireless Application Protocol (WAP), Hypertext Transfer Protocol (HTTP), and/or the like, for example.

The electronic apparatus 10 may comprise a user interface for providing output and/or receiving input. The electronic apparatus 10 may comprise an output device 14. Output device 14 may comprise an audio output device, such as a ringer, an earphone, a speaker, and/or the like. Output device 14 may comprise a tactile output device, such as a vibration transducer, an electronically deformable surface, an electronically deformable structure, and/or the like. Output device 14 may comprise a visual output device, such as a display, a light, and/or the like. In at least one example embodiment, the apparatus causes display of information, the causation of display may comprise displaying the information on a display comprised by the apparatus, sending the information to a separate apparatus that comprises a display, and/or the like. The electronic apparatus may comprise an input device 13. Input device 13 may comprise a light sensor, a proximity sensor, a microphone, a touch sensor, a force sensor, a button, a keypad, a motion sensor, a magnetic field sensor, a camera, and/or the like. A touch sensor and a display may be characterized as a touch display. In an embodiment comprising a touch display, the touch display may be configured to receive input from a single point of contact, multiple points of contact, and/or the like. In such an embodiment, the touch display and/or the processor may determine input based, at least in part, on position, motion, speed, contact area, and/or the like. In at least one example embodiment, the apparatus receives an indication of an input. The apparatus may receive the indication from a sensor, a driver, a separate apparatus, and/or the like. The information indicative of the input may comprise information that conveys information indicative of the input, indicative of an aspect of the input indicative of occurrence of the input, and/or the like.

The electronic apparatus 10 may include any of a variety of touch displays including those that are configured to enable touch recognition by any of resistive, capacitive, infrared, strain gauge, surface wave, optical imaging, dispersive signal technology, acoustic pulse recognition or other techniques, and to then provide signals indicative of the location and other parameters associated with the touch. Additionally, the touch display may be configured to receive an indication of an input in the form of a touch event which may be defined as an actual physical contact between a selection object (e.g., a finger, stylus, pen, pencil, or other pointing device) and the touch display. Alternatively, a touch event may be defined as bringing the selection object in proximity to the touch display, hovering over a displayed object or approaching an object within a predefined distance, even though physical contact is not made with the touch display. As such, a touch input may comprise any input that is detected by a touch display including touch events that involve actual physical contact and touch events that do not involve physical contact but that are otherwise detected by the touch display, such as a result of the proximity of the selection object to the touch display. A touch display may be capable of receiving information associated with force applied to the touch screen in relation to the touch input. For example, the touch screen may differentiate between a heavy press touch input and a light press touch input. In at least one example embodiment, a display may display two-dimensional information, three-dimensional information and/or the like.

In embodiments including a keypad, the keypad may comprise numeric (for example, 0-9) keys, symbol keys (for example, #, *), alphabetic keys, and/or the like for operating the electronic apparatus 10. For example, the keypad may comprise a conventional QWERTY keypad arrangement. The keypad may also comprise various soft keys with associated functions. In addition, or alternatively, the electronic apparatus 10 may comprise an interface device such as a joystick or other user input interface.

Input device 13 may comprise a media capturing element. The media capturing element may be any means for capturing an image, video, and/or audio for storage, display or transmission. For example, in at least one example embodiment in which the media capturing element is a camera module, the camera module may comprise a digital camera which may form a digital image file from a captured image. As such, the camera module may comprise hardware, such as a lens or other optical component(s), and/or software necessary for creating a digital image file from a captured image. Alternatively, the camera module may comprise only the hardware for viewing an image, while a memory device of the electronic apparatus 10 stores instructions for execution by the processor 11 in the form of software for creating a digital image file from a captured image. In at least one example embodiment, the camera module may further comprise a processing element such as a co-processor that assists the processor 11 in processing image data and an encoder and/or decoder for compressing and/or decompressing image data. The encoder and/or decoder may encode and/or decode according to a standard format, for example, a Joint Photographic Experts Group (JPEG) standard format.

Figures 2A, 2B:
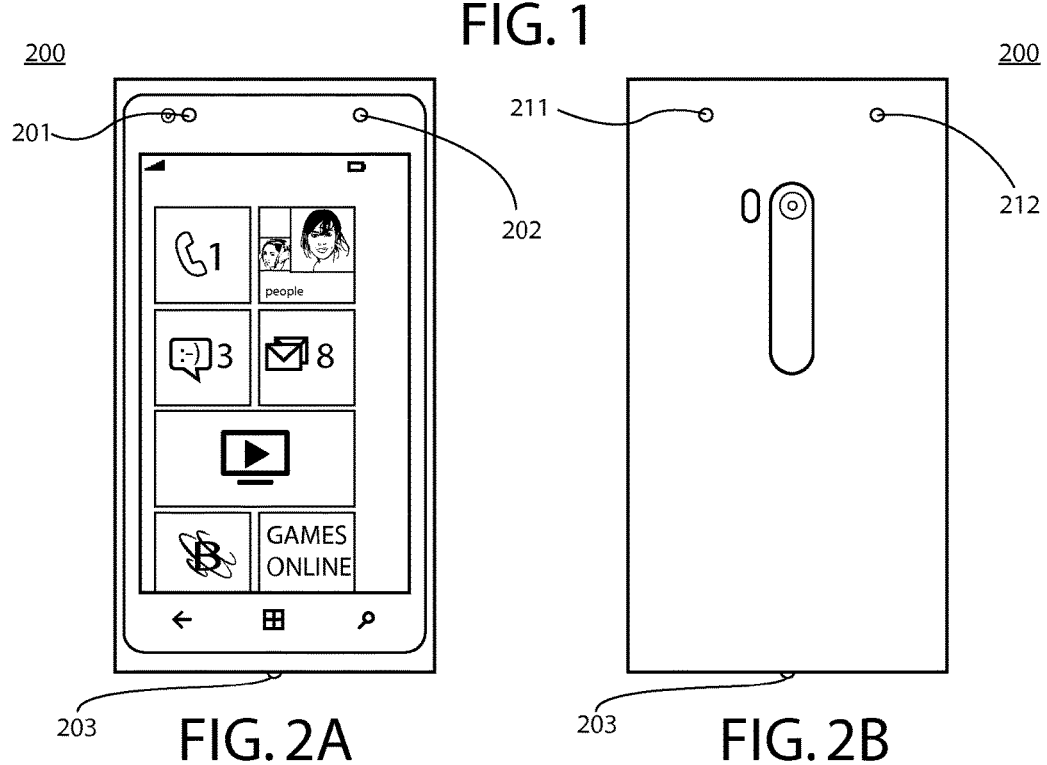
FIGS. 2A-2B are diagrams illustrating microphones comprised by an apparatus according to at least one example embodiment.

FIGS. 2A-2B are diagrams illustrating microphones comprised by an apparatus according to at least one example embodiment. The examples of FIGS. 2A-2B are merely examples and do not limit the scope of the claims. For example, configuration of the apparatus may vary, size of the apparatus may vary, number of microphones may vary, position of microphones may vary, orientation of microphones may vary, and/or the like.

In some circumstances, it may be desirable for an apparatus to comprise a plurality of microphones. For example, the apparatus may receive audio information by way of one or more of the microphones to perform various actions, such as record audio information, analyze audio information, transmit audio information, and/or the like. In some circumstances, it may be desirable for the microphones to be located at different positions on the apparatus. For example, it may be desirable to differentiate between audio information that is incident to a particular part of the apparatus and other audio information that is incident to a different part of the apparatus. In this manner, the audio that is present in the environment surrounding the apparatus may be perceived differently by different microphones comprised by the apparatus. For example, the apparatus may determine audio information based, at least in part, on different audio information received across different microphones. In this manner, the apparatus may evaluate the various instances of audio information to determine a particular audio signal. In this manner, the apparatus may determine audio information based, at least in part, on a plurality of microphone audio information.

In at least one example embodiment, an apparatus receives audio information by way of a plurality of microphones comprised by an apparatus. The plurality of microphones may be positioned at various positions on the apparatus. In this manner, the various microphones are indicative of audio information that is incident to the apparatus at a position that corresponds with an individual microphone.

FIG. 2A is a diagram illustrating microphones comprised by apparatus 200 according to at least one example embodiment. The example of FIG. 2A illustrates the front of apparatus 200. It can be seen that apparatus 200 comprises front facing microphones 201 and 202, and bottom facing microphone 203. FIG. 2B is a diagram illustrating microphones comprised by apparatus 200 according to at least one example embodiment. The example of FIG. 2B illustrates the rear of apparatus 200. It can be seen that apparatus 200 comprises rear facing microphones 211 and 212.

In some circumstances, it may be desirable to utilize one or more of the microphones in conjunction with each other. For example, it may be desirable to determine a particular set of audio information that is based, at least in part, on a plurality of audio information received by way of a plurality of microphones. In at least one example embodiment, receipt of audio information comprises receipt of a first audio information by way of a first microphone and receipt of a second audio information by way of a second microphone. In such an example, a particular set of audio information may be indicated by both the first audio information and the second audio information. For example, there may be a sound present in the environment surrounding apparatus 200 such that microphone 201 receives the first audio information and microphone 203 receives the second audio information. In such an example, the first audio information may comprise a representation of the sound and the second audio information may comprise a different representation of the sound. In such an example, the apparatus may determine audio information indicative of the sound based, at least in part, on the first audio information and the second audio information. In this manner, the determined audio information, the first audio information, and the second audio information are each indicative of the same audio content, even though the representation of the audio content comprised by each of the determined audio information, the first audio information, and the second audio information may differ from each other.

In at least one example embodiment, the content of the audio information refers to the information conveyed by the audio information. For example, if the audio information comprises speech, the content of the audio information may comprise the voice information indicative of the speech. In another example, if the audio information comprises an audio cue, such as fingers snapping, a clap, a tune, and/or the like, the content of the audio information may be the audio cue.

In some circumstances, even though the content of different audio information that corresponds with different microphones may be indicative of the same content, one or more such different audio information may vary regarding audio properties. For example, a frequency spectrum indicative of the audio content may vary, attenuation of the audio content may vary, receipt time of the audio content may vary, and/or the like. For example, audio content indicated by a first audio information received by way of a first microphone may differ from a second audio information indicative of the audio content received by way of a second microphone. In such an example, the first audio information and the second audio information may differ by way of frequency spectrum, attenuation, receipt time, and/or the like. For example, the first audio information may be a representation of audio content that exhibits a time deviation from the second audio information. In this manner, the apparatus may evaluate the audio content based, at least in part, on determination of differences across a plurality of audio information that is indicative of the same audio content.

FIGS. 3A-3D are diagrams illustrating circumstances indicative of spatial audio properties according to at least one example embodiment. The examples of FIGS. 3A-3D are merely examples and do not limit the scope of the claims. For example, orientation of the apparatus may vary, number of voice sources may vary, orientation of the voice sources may vary, and/or the like.

In some circumstances, it may be desirable to determine one or more spatial audio properties of audio information received by an apparatus. For example, it may be desirable to differentiate between audio information from audio sources having different distances from the apparatus, at different angles from the apparatus, and/or the like.

In at least one example embodiment, the apparatus determines at least one spatial audio property of the audio information in relation to the apparatus. The apparatus may determine the spatial property in relation to the apparatus by way of evaluating audio information that is indicative of an audio signal received from various microphones at various positions on the apparatus. In this manner, the spatial property may be a direction, a distance, and/or the like from the apparatus that indicates a spatial relationship between the apparatus and a source of the audio signal. In at least one example embodiment, an audio source is a physical body that causes an audio signal to occur, such as a person, an object, an audio transducer, and/or the like.

In at least one example embodiment, the apparatus determines the spatial property of the audio information by way of evaluating differences in different audio information received from different microphones. In at least one example embodiment, the apparatus determines the spatial audio property based, at least in part, on comparison of the differing audio information. For example, if the apparatus receives a first audio information from a first microphone and a second audio information from a second microphone, the apparatus may determine the spatial audio property based, at least in part, on comparison of the first audio information and the second audio information.

In at least one example embodiment, the spatial property is an audio distance, an audio direction, and/or the like. In at least one example embodiment, the audio direction is a direction of an audio path between the apparatus and a source of the audio information. In at least one example embodiment, the audio distance is a distance along an audio path between the apparatus and a source of the audio information. In at least one example embodiment, an audio path is a delineation between an audio source and a microphone along which an audio signal propagates from the audio source to the microphone. For example, the apparatus may determine a spatial property of the audio information that indicates that an audio signal that was received from an audio source that is a particular distance from the apparatus, that is located in a particular direction from the apparatus, and/or the like. In at least one example embodiment, the spatial property is both an audio distance and an audio direction. For example, the apparatus may determine a spatial property of the audio information that indicates that an audio signal that was received from an audio source that is a particular distance from the apparatus and is located in a particular direction from the apparatus.

In at least one example embodiment, the comparison comprises identifying a signal time difference between a first audio information and a second audio information. In at least one example embodiment, a signal time difference refers to a difference in time at which particular audio content is represented in the first audio information and the second audio information. In at least one example embodiment, the comparison comprises identifying a signal attenuation difference between the first audio information and the second audio information. In at least one example embodiment, a signal attenuation difference refers to a difference in audio strength at which particular audio content is represented in the first audio information and the second audio information. It should be understood that there are currently many manners to determine a spatial property of audio information, such as multilateration, time difference on arrival (TDOA), frequency difference on arrival (FDOA), triangulation, trilateration, etc. In addition, there are likely to be many manners to determine a spatial property of audio information developed in the future. Therefore, the manner in which the spatial property is determined does not necessarily limit the claims in any way.

Figure 3A:
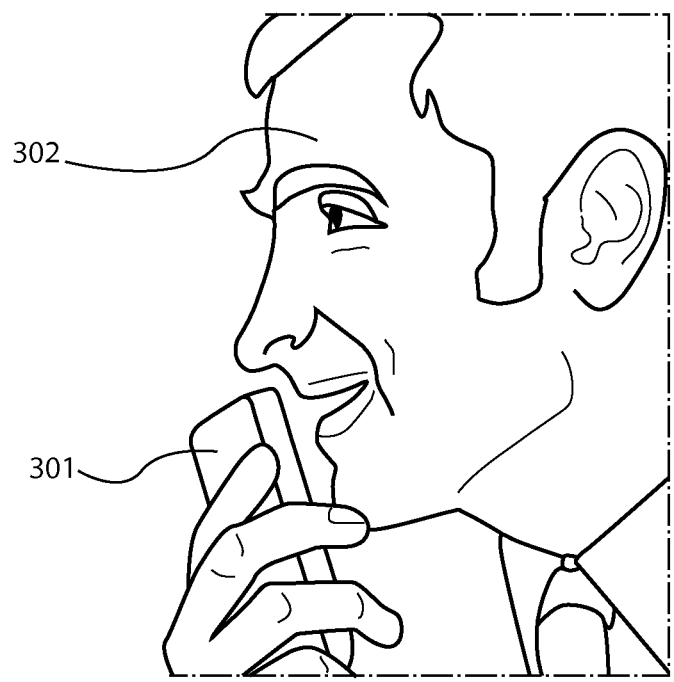
FIGS. 3A-3D are diagrams illustrating circumstances indicative of spatial audio properties according to at least one example embodiment.

FIG. 3A is a diagram illustrating circumstances indicative of spatial audio properties according to at least one example embodiment. In the example of FIG. 3A, user 302 is speaking towards apparatus 301. In this manner, the mouth of user 302 is an audio source of audio information, such as voice information, received by apparatus 301. It can be seen that the mouth of user 302 is proximate, less than 10 centimeters, to apparatus 301. In the example of FIG. 3A, apparatus 301 receives audio information indicative of the voice of user 302 and determines a spatial property of the audio information. The spatial property may indicate the distance of user 302 from apparatus 301, the direction of user 302 from apparatus 301, and/or the like. For example, the apparatus may determine that user 302 is speaking towards the front of apparatus 301, is speaking proximate to apparatus 301, and/or the like.

Figure 3B:
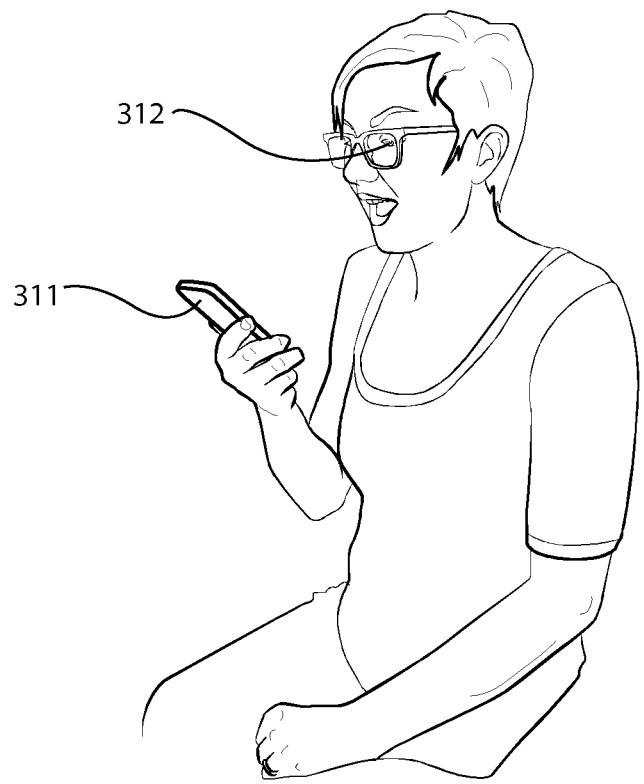

FIG. 3B is a diagram illustrating circumstances indicative of spatial audio properties according to at least one example embodiment. In the example of FIG. 3B, user 312 is speaking towards apparatus 311. In this manner, the mouth of user 312 is an audio source of audio information, such as voice information, received by apparatus 311. It can be seen that the mouth of user 312 is proximate, approximately 30 centimeters, to apparatus 311. In the example of FIG. 3B, apparatus 311 receives audio information indicative of the voice of user 312 and determines a spatial property of the audio information. The spatial property may indicate the distance of user 312 from apparatus 311, the direction of user 312 from apparatus 311, and/or the like. For example, the apparatus may determine that user 312 is speaking towards the front of apparatus 311, is speaking proximate to apparatus 311, and/or the like. It can be seen that the distance between user 312 and apparatus 311 is greater than the distance in FIG. 3A between user 302 and apparatus 301. In at least one example embodiment, the apparatus determines a greater audio distance under the circumstances indicated by FIG. 3B than under the circumstances indicated by FIG. 3A.

Figure 3C:
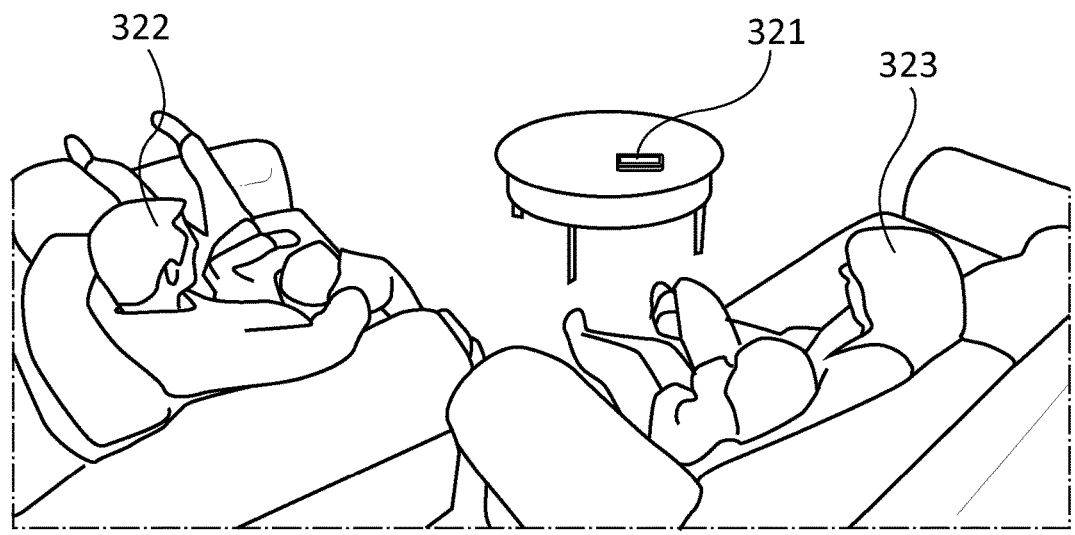

FIG. 3C is a diagram illustrating circumstances indicative of spatial audio properties according to at least one example embodiment. In the example of FIG. 3C, person 322 and person 323 are speaking to each other while apparatus 321 is on a table remote from, approximately 2 meters from, person 322 and person 323. In this manner, the mouth of person 322 is an audio source of audio information, such as voice information, received by apparatus 321. Similarly, the mouth of person 323 is an audio source of audio information, such as voice information, received by apparatus 321. It can be seen that the mouth of person 322 is remote from apparatus 321 and that the mouth of person 323 is remote from apparatus 321. In the example of FIG. 3C, apparatus 321 receives audio information indicative of the voice of person 322 and determines a spatial property of the audio information. The spatial property may indicate the distance of person 322 from apparatus 321, the direction of person 322 from apparatus 321, and/or the like. For example, the apparatus may determine that person 322 is speaking towards the side of apparatus 321, is speaking remotely from apparatus 321, and/or the like. In the example of FIG. 3C, apparatus 321 receives audio information indicative of the voice of person 323 and determines a spatial property of the audio information. The spatial property may indicate the distance of person 323 from apparatus 321, the direction of person 323 from apparatus 321, and/or the like. For example, the apparatus may determine that person 323 is speaking towards the side of apparatus 321, is speaking remotely from apparatus 321, and/or the like. It can be seen that the distance between person 322 and apparatus 321 is greater than the distance in FIG. 3B between person 312 and apparatus 311. It can be seen that the distance between person 323 and apparatus 321 is greater than the distance in FIG. 3B between person 312 and apparatus 311. In at least one example embodiment, the apparatus determines a greater audio distance under the circumstances indicated by FIG. 3C than under the circumstances indicated by FIG. 3B.

Figure 3D:
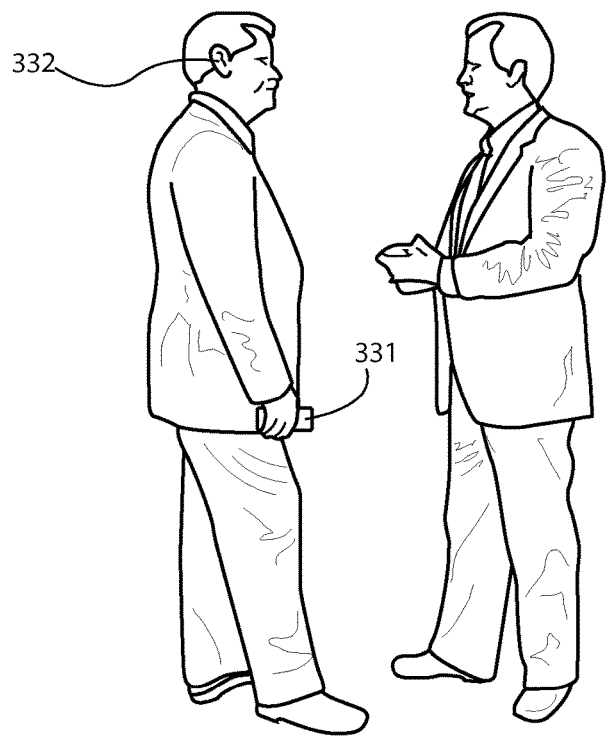

FIG. 3D is a diagram illustrating circumstances indicative of spatial audio properties according to at least one example embodiment. As previously described, audio information may be voice information. In such an example the apparatus may determine whether the voice information is received from an audio source that is directed towards the apparatus, directed away from the apparatus, and/or the like. For example, it may be desirable to be able to differentiate between voice information received from a user who is facing the apparatus from voice information received from a user who is facing away from the apparatus.

In at least one example embodiment, the apparatus determines a spatial audio property that indicates whether an audio source is directed towards the apparatus, away from the apparatus, and/or the like. Human voice characteristics may change based on the orientation of the audio source and the microphone. If the audio source is directed away from the microphone, high frequencies may appear attenuated in comparison to circumstances where the audio source is directed towards the microphone. In at least one example embodiment, the apparatus stores historical voice information associated with a particular user, and compares the historical voice information to the received voice information to determine the spatial audio property. The apparatus may generate the historical voice information associated with the user by continuously or occasionally recording short clips of the voice of the user. The high to low frequency ratios of these clips may be represented in the historical voice information. In this manner, when the apparatus receives voice information from the user, the high to low frequency ratio of the voice information may be compared to the stored ratios to determine whether the user is speaking towards the apparatus or away from the apparatus.

In the example of FIG. 3D, user 332 is speaking to a person while holding apparatus 331 in his hand. In this manner, the mouth of user 332 is an audio source of audio information, such as voice information, received by apparatus 331. It can be seen that the mouth of user 332 is directed away from apparatus 331. In the example of FIG.

3D, apparatus 331 receives audio information indicative of the voice of user 332 and determines a spatial property of the audio information. The spatial property may indicate that the voice of user 332 is directed away from apparatus 331. In at least one example embodiment, the apparatus determines that the voice of a user is directed towards the apparatus to a greater audio extent under the circumstances indicated by FIG. 3B than under the circumstances indicated by FIG. 3D.

FIGS. 4A-4C are diagrams illustrating correlation between a spatial audio property and an operational directive according to at least one example embodiment. The examples of FIGS. 4A-4C are merely examples and do not limit the scope of the claims. For example, the manner in which correlations are implemented may vary, number of spatial properties may vary, number of operational directives may vary, and/or the like.

In some circumstances, the apparatus may perform one or more operations based, at least in part, on received audio information. For example, the apparatus may identify particular audio content represented by the audio signal, such as a voice, clapping hands, snapping fingers, jingling keys, howling, stomping feet, barking dog, car door/tires/brakes, refrigerator door closing/opening, and/or the like. For example, an apparatus may invoke a particular set of functionality in response to receiving particular audio information. In this manner, the audio information may serve as a command that causes the apparatus to perform a set of operations.

In at least one example embodiment, an apparatus determines an operational directive based at least on audio information received from a plurality of microphones. In at least one example embodiment, an operational directive is a directive that instructs the apparatus to perform a particular set of operations that are associated with the directive. For example, the operational directive may indicate a particular message, function call, data structure, class, memory location, and/or the like, for the apparatus to utilize. For example, the operational directive may be a directive that causes the apparatus to branch to a particular set of computer program instructions that perform actions. In this manner, the operational directive causes the apparatus to perform a particular set of operations. In at least one example embodiment, the apparatus performs one or more operations in conformance with the operational directive. In at least one example embodiment, performance of the operations in conformance with the operational directive comprises performance of one or more computer program instructions that are associated with the operational directive, such as computer program instructions that the operational directive designates by way of memory address, function name, data structure name, class name, and/or the like. For example, the operational directive may be a call initiation operational directive that identifies a function call that comprises operations that cause the apparatus to initiate a phone call. In such an example, the apparatus performs the operations that initiate the phone call in conformance with the call initiation operational directive. In another example, the operational directive may be an audio processing operational directive that identifies a function call associated with audio processing, such as invocation of a speech recognition program, a recording program, and/or the like.

The operational directive may govern one or more functions that the apparatus is configured to perform. For example the operational directive may indicate one or more operations that are associated with transmission of the audio information to a separate apparatus. In such an example, the operational directive may correspond with operations that cause particular audio information to be transmitted to a separate apparatus (such as an unmute function), that preclude particular audio information from being transmitted to a separate apparatus (such as a mute function), that invoke voice recognition, and/or the like. In at least one example embodiment, the operational directive indicates operations that are independent of processing of the audio information. For example, the operational directive may indicate a program launching operation, a send message operation, a status change operation, an open file operation, and/or the like.

In some circumstances, it may be desirable to govern operations that affect user availability based, at least in part, on spatial audio properties. In at least one example embodiment, the apparatus determines a user availability status operational directive based, at least in part, on spatial audio information. The user availability status may be any indication of user availability, such as presence information, activity information, and/or the like, for social media services, instant messaging services, work tracking services, and/or the like. For example, when the apparatus receives voice information that has a spatial property indicating that the speaker of the voice information is directed towards the apparatus, the apparatus may determine a user available status operational directive that causes indication of user availability. Similarly, when the apparatus receives voice information that has a spatial property indicating that the speaker of the voice information is directed away from the apparatus, the apparatus may determine a user unavailable status operational directive that causes indication of user unavailability. In this manner, the apparatus may determine that a user is active if the user is speaking toward the apparatus, may determine that the user is inactive if the user is speaking away from the apparatus, and/or the like. In another example, when the apparatus receives voice information that has a spatial property indicating that the speaker of the voice information is within a particular distance from the apparatus, the apparatus may determine a user available status operational directive that causes indication of user availability. Similarly, when the apparatus receives voice information indicating that the speaker of the voice information is beyond a particular distance from the apparatus, the apparatus may determine a user unavailable status operational directive that causes indication of user unavailability. In this manner, the apparatus may determine that a user is active if the user is speaking proximate to the apparatus, may determine that the user is inactive if the user is speaking remotely from the apparatus, and/or the like.

In some circumstances, it may be desirable for audio information that is coming further away to be filtered and not sent to a separate apparatus, for example during a call. In this manner, audio information that may be background noise may be filtered from transmission. In this manner, such distant audio information may be muted and not sent to the separate apparatus.

In at least one example embodiment, the apparatus determines a mute/unmute operational directive based, at least in part, on spatial audio information. For example, when the apparatus receives audio information that has a spatial property indicating that the source of the audio information is within a particular distance from the apparatus, the apparatus may determine to avoid muting the audio information, unmute the audio information, and/or the like. Similarly, when the apparatus receives audio information indicating that the source of the audio information is beyond a particular distance from the apparatus, the apparatus may determine to mute the audio information.

In at least one example embodiment, the apparatus determines a security level based, at least in part on the audio direction. For example, the apparatus may disable display of private information based, at least in part, on the audio direction. For example, the user may speak from an audio direction that is on a display side of the apparatus. In such an example, the apparatus may disable display of private information based, at least in part on the voice direction being from a display side of the apparatus.

In at least one example embodiment, the apparatus adjusts audio rendering settings based, at least in part, on the audio direction. For example, the apparatus may adjust volume, surround sound, equalization, and/or the like based, at least in part on the audio direction. For example, the apparatus may increase volume, enable surround sound, and/or the like, based, at least in part, on determination that speech is being received from a plurality of audio directions. In this manner, the apparatus may automatically adjust audio rendering settings to be more appropriate for a group of people.

In at least one example embodiment, the apparatus determines an operational directive based, at least in part, on a spatial audio property. For example, the apparatus may determine the operational directive based, at least in part, on the spatial audio property indicating a particular distance, indicating a particular direction, being directed towards the apparatus, being directed away from the apparatus, and/or the like. For example, the apparatus may determine an operational directive based, at least in part, on an audio spatial property indicated by the circumstances of FIG. 3A, and determine a different operational directive based, at least in part, on a spatial audio property indicated by the circumstances of FIG. 3C.

It should be understood that determination of an operational directive may be performed in various manners, such as a lookup table, a comparison, and/or the like. For example the apparatus may determine an operational directive by way of correlating one or more spatial audio properties with a range of spatial audio properties associated with the operational directive. In such an example, a particular operational directive may be invoked when the apparatus receives audio information that has a spatial audio property that corresponds with the range of spatial audio properties. In at least one example embodiment, the apparatus determines the operational directive based, at least in part, on correlation between the spatial audio property and a predetermined audio spatial property that is associated with the operational directive. The predetermined spatial audio property may indicate a specific spatial audio property, a range of spatial audio properties, and or the like. For example, an audio distance of 10 centimeters may be associated with a dictation operational directive. In another example, an audio distance of less than 10 centimeters may be associated with the dictation operational directive.

FIG. 4A is a diagram illustrating correlation between a spatial audio property and an operational directive according to at least one example embodiment. In the example of FIG. 4A, distance 401 corresponds with operational directive 403, distance 404 corresponds with operational directive 406, and distance 407 corresponds with operational directive 409. In the example of FIG. 4A, the apparatus determines operational directive 403 when the spatial audio property corresponds with distance 401, determines operational directive 406 when the spatial audio property corresponds with distance 404, and determines operational directive 409 when the spatial audio property corresponds with distance 407.

FIG. 4B is a diagram illustrating correlation between a spatial audio property and an operational directive according to at least one example embodiment. In the example of FIG. 4B, direction 411 corresponds with operational directive 413, direction 414 corresponds with operational directive 416, and direction 417 corresponds with operational directive 419. In the example of FIG. 4B, the apparatus determines operational directive 413 when the spatial audio property corresponds with direction 411, determines operational directive 416 when the spatial audio property corresponds with direction 414, and determines operational directive 419 when the spatial audio property corresponds with direction 417.

In some circumstances, the apparatus bases the operational directive on a plurality of the properties indicated by the spatial audio properties. For example, the apparatus may determine the operational directive based, at least in part, on an audio property that indicates at least two of a particular audio distance, a particular audio direction, being directed towards the apparatus, and/or the like.

FIG. 4C is a diagram illustrating correlation between a spatial audio property and an operational directive according to at least one example embodiment.

In the example of FIG. 4C, distance 421 with direction 422 corresponds with operational directive 423, distance 421 with direction 424 corresponds with operational directive 425, and distance 426 with direction 422 corresponds with operational directive 427. It can be seen in the example of FIG. 4C that the apparatus may determine a particular operational directive based, at least in part, on a distance and a direction, and determine a different operational directive based, at least in part, on the same distance and a different direction. Similarly, it be seen in the example of FIG. 4C that the apparatus may determine a particular operational directive based, at least in part, on a distance and a direction, and determine a different operational directive based, at least in part, on a different distance and the same direction. In the example of FIG. 4C, the apparatus determines operational directive 423 when the spatial audio property corresponds with distance 421 and direction 422, determines operational directive 425 when the spatial audio property corresponds with distance 421 and direction 424, and determines operational directive 427 when the spatial audio property corresponds with distance 426 and direction 422.

As previously described, in some circumstances, the audio information may be voice information. In at least one example embodiment, voice information is audio information that comprises an audio representation of speech. In at least one example embodiment, the apparatus determines that the audio information is voice information. For example, the apparatus may determine that the audio information exhibits properties that are consistent with the audio information being voice information. It should be understood that there are many manners in which an apparatus may determine that audio information is voice information. Similarly, there are likely to be many manners developed in the future for an apparatus to determine that audio information is voice information. Therefore, the manner in which the apparatus determines that audio information is voice information does not necessarily limit the claims in any way.

In some circumstances, the voice information may comprise voice commands. For example, the voice command may be speech having content that invokes a particular interface command. For example, the voice command may comprise a verbal expression of words that are associated with invocation of an operational directive.

In at least one example embodiment, the apparatus receives voice information that comprises voice command audio information. In at least one example embodiment, voice command audio information is audio information that contains a representation of a voice command, such as an utterance of the voice command. In such an example, the apparatus may identify a voice command based, at least in part, on the voice command information and may determine an operational directive based, at least in part, on a voice command audio information. For example, the apparatus may determine the voice command by way of speaker dependent voice recognition, speaker independent voice recognition, and/or the like. It should be understood that there are many manners in which an apparatus may identify a voice command. Similarly, there are likely to be many manners developed in the future for an apparatus to identify a voice command. Therefore, the manner in which the apparatus identifies a voice command does not necessarily limit the claims in any way. In at least one example embodiment, the apparatus determines an operational directive based, at least in part, on the voice command. For example the apparatus may receive voice information that represents a call answer voice command. In such an example, the apparatus may determine an operational directive that causes the apparatus to answer an incoming call based, at least in part, on the call answer voice command.

In at least one example embodiment, the apparatus determines an operational directive based, at least in part, on a spatial audio property and a voice command. For example the apparatus may receive voice information that represents the voice command and has a particular spatial audio quality. In such an example, the apparatus may determine the operational directive based, at least in part, on both the spatial audio property and the voice command.

In some circumstances, it may be desirable to vary the operational directive associated with a voice command based, at least in part, on a spatial audio property of the voice information that represents the voice command. For example, it may be desirable to control different application functionality by way of the audio direction. For example, regarding voice commands for an image capture program, the apparatus may limit control of a self-timer capture function to voice information that has a near audio distance. In such an example, the apparatus may allow for other voice commands to be invoked by way of voice information that has a further audio distance.

In some circumstances, it may be desirable to identify a program to be governed by the operational directive based, at least in part, on the spatial audio property. For example, it may be desirable for the operational directive to govern an active program when the audio information is directed towards the apparatus and for the operational directive to govern a different program when the audio information is directed away from the apparatus. In this manner, when the user is speaking towards the apparatus, a voice command may be passed to the active program. Likewise, when the user is speaking away from the apparatus, a voice command may be passed to a different program.

Figure 5:
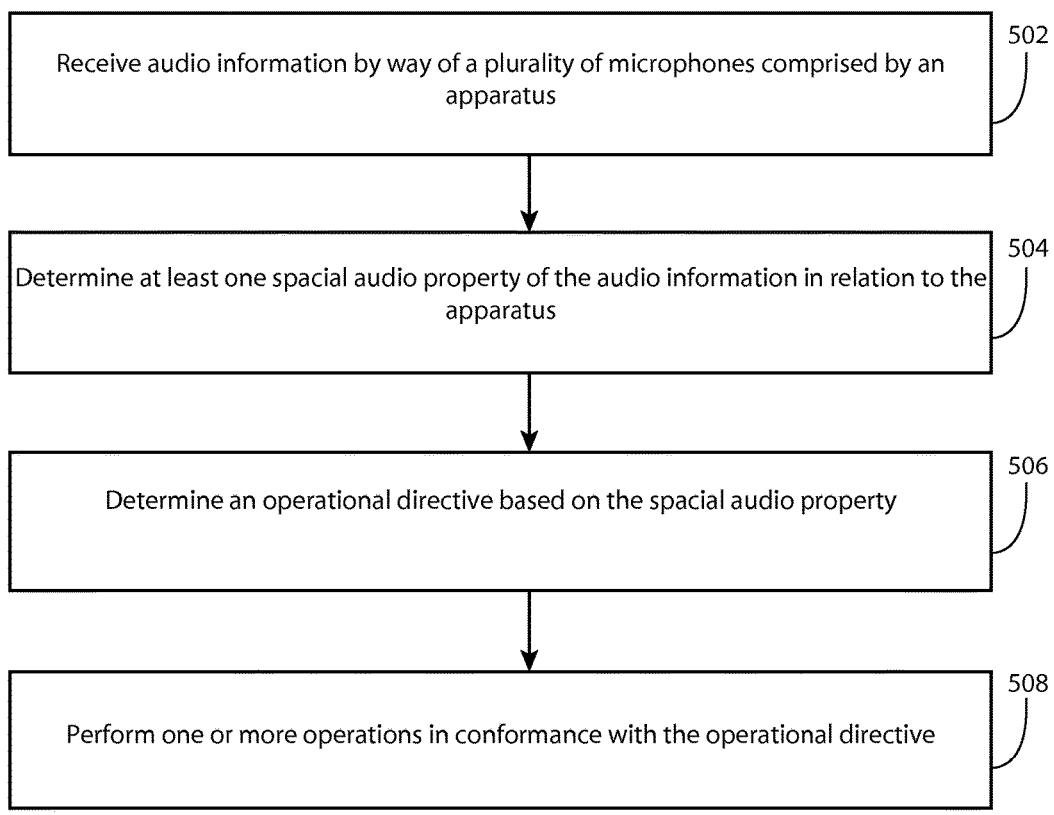
FIG. 5 is a flow diagram illustrating activities associated with determination of an operational directive based, at least in part, on the spatial audio property according to at least one example embodiment.

FIG. 5 is a flow diagram illustrating activities associated with determination of an operational directive based, at least in part, on the spatial audio property according to at least one example embodiment. In at least one example embodiment, there is a set of operations that corresponds with the activities of FIG. 5. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 5.

At block 502, the apparatus receives audio information by way of a plurality of microphones comprised by the apparatus. The receipt, the audio information, and the microphones may be similar as described regarding FIGS. 2A-2B.

At block 504, the apparatus determines at least one spatial audio property of the audio information in relation to the apparatus. The determination and the spatial audio property may be similar as described regarding FIGS. 3A-3D.

At block 506, the apparatus determines an operational directive based, at least in part, on the spatial audio property. The determination and the operational directive may be similar as described regarding FIGS. 4A-4C.

At block 508, the apparatus performs one or more operations in conformance with the operational directive. The performance, and the operations may be similar as described regarding FIGS. 4A-4C.

Figure 6:
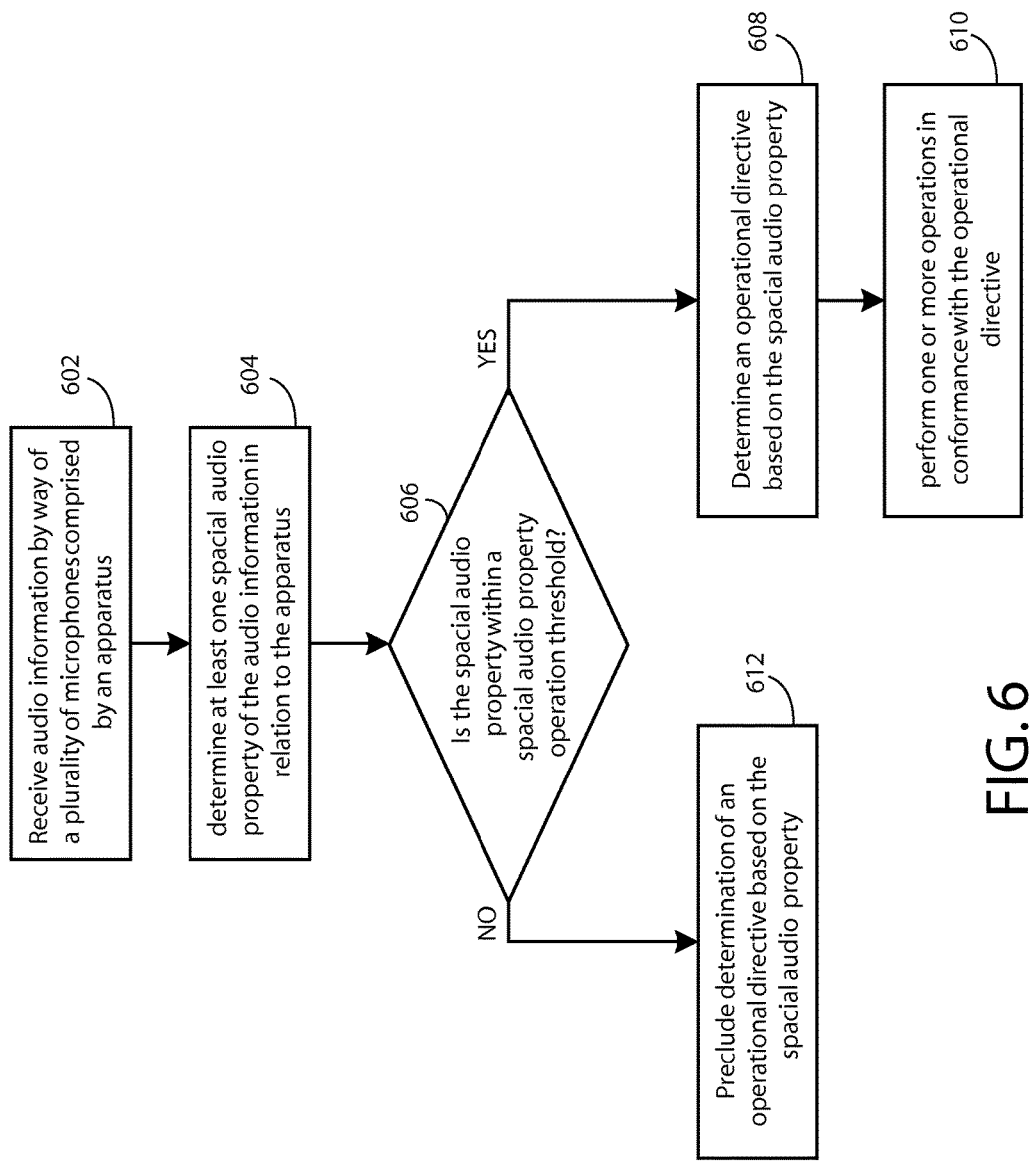
FIG. 6 is a flow diagram illustrating activities associated with determination of an operational directive based, at least in part, on the spatial audio property according to at least one example embodiment.

FIG. 6 is a flow diagram illustrating activities associated with determination of an operational directive based, at least in part, on the spatial audio property according to at least one example embodiment. In at least one example embodiment, there is a set of operations that corresponds with the activities of FIG. 6. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 6.

In some circumstances, it may be desirable to determine whether the spatial audio information is within a particular range. For example, if the spatial audio property different from a particular range, it may be desirable to preclude determination of an operational directive based, at least in part, on the audio information. For example, the particular range may limit the circumstances in which the apparatus determines the operational directive.

In at least one example embodiment, determination of the operational directive comprises determination that the spatial audio property is within a spatial audio property operation threshold. In such an example, determination of the operational directive may be based, at least in part, on the determination that the spatial audio property is within the spatial audio property operation threshold. In at least one example embodiment, the spatial audio property operation threshold is a predetermined range of spatial audio properties such that a spatial audio property within the predetermined range allows for determination of one or more operational directives. In this manner, the spatial audio property operation threshold may be a predetermined range of spatial audio properties such that a spatial audio property beyond the predetermined range precludes determination of one or more operational directives. For example, the predetermined range may be a range of audio distances within which the apparatus will determine operational directives and beyond which the apparatus precludes determination of an operational directive.

In at least one example embodiment, the spatial audio property operation threshold is a directional audio property operation threshold. In at least one example embodiment, the directional audio property operation threshold is a predetermined range of directions. Such a range of directions may correspond with an audio source being directed towards the apparatus, an audio source being directed away from the apparatus, an audio source within a particular range of directions from the apparatus, and/or the like. In such an example, an audio direction that corresponds with the audio source being directed away from the apparatus may cause preclusion of determination of one or more operational directives.

In at least one example embodiment, the spatial audio property operation threshold is a distance audio property operation threshold. In at least one example embodiment, the distance audio property operation threshold is a predetermined range of distances. Such a range of distances may correspond with an audio source being proximate to the apparatus. In at least one example embodiment, proximate to the apparatus may be within 5 centimeters, within 10 centimeters, within 100 centimeters, within 1 meter, and/or the like. In at least one example embodiment, an audio distance may be considered to be remote from the apparatus if the audio distance is beyond a predetermined range of distances that indicate proximity. In such an example, an audio distance that corresponds with the audio source being remote from the apparatus may cause preclusion of determination of one or more operational directives. For example, when an apparatus notifies a user of an incoming call, the user may invoke an operational directive for answering the incoming phone call by uttering "hello" in the proximity of the device. In such an example, the apparatus may identify "hello" as a voice command based, at least in part, on the proximity of the user to the apparatus. In another example, the apparatus may determine that a spatial audio property as indicated in the example of FIG. 3A is within a spatial audio property operation threshold for a dictation operational directive. In such an example, the apparatus may avoid performing the operations of the dictation program when the user is beyond the predetermined distance range identified by the spatial audio property operation threshold.

In some circumstances it may be desirable for an apparatus to utilize a voice command prompt to precede an utterance of a voice command. In at least one example embodiment, a voice command prompt is voice information that identifies subsequent voice information as a voice command. For example, an apparatus may differentiate non-command audio information by way of the voice command prompt such that the apparatus identifies a voice command after the apparatus recognizes that audio information comprises a voice command prompt. For example, a voice command prompt may be "computer," such that an utterance of "computer, send message" allows the apparatus to identify the utterance of "send message" subsequent to the voice command prompt of "computer" as a voice command utterance.

In some circumstances, it may be desirable to retain the ability of the user to indicate to the apparatus that voice information is intended to be a voice command. In this manner, the spatial audio property may indicate a user's intent for an utterance to be a voice command. For example, a user may hold the apparatus as indicated in FIGS. 3A-3B when uttering a voice command. In such an example, the apparatus may utilize a spatial audio property operation threshold to determine when to identify a voice command, determine an operational directive based on the voice command, and/or the like.

In at least one example embodiment, the audio information comprises voice command audio information. In such an example, the apparatus may predicate identification of the voice command on determination that the spatial audio property is within a spatial audio property operation threshold. In such an example, the user may avoid being forced to utter the voice command prompt. In such an example, the voice command audio information may be absent information indicative of a voice command prompt.

For example, it may be desirable for the user to be able to control features of a program easily without having to separately initiate speech recognition. In such an example, the apparatus may recognize when the user is in the close proximity of the device and speaking In this case, the voice information can be used to control program functionality.

In some circumstances, when the apparatus determines that a spatial voice property is within the spatial voice property operation threshold, the apparatus may cause actuation of an indication of voice input availability, such as an audio 'beep' before executing the command, a visual indication that the command was recognized, and/or the like.

In some circumstances, the manner in which the apparatus determines the operational directive based on the spatial audio property is based, at least in part, on one or more aspects of a program to be affected by the operational parameter. For example, an image capture program may be autofocused at a particular depth. In such an example, the apparatus may avoid identifying voice information associated with spatial audio information that indicates an audio distance that differs from the particular depth. In such an example, a person at the particular depth may be able to provide voice commands to the apparatus.

At block 602, the apparatus receives audio information by way of a plurality of microphones comprised by the apparatus, similarly as described regarding block 502 of FIG. 5. At block 604, the apparatus determines at least one spatial audio property of the audio information in relation to the apparatus, similarly as described regarding block 504 of FIG. 5.

At block 606, the apparatus determines whether the spatial audio property is within a spatial audio property operation threshold. If the apparatus determines that the spatial audio property is within a spatial audio property operation threshold, flow proceeds to block 608. If the apparatus determines that the spatial audio property fails to be within a spatial audio property operation threshold, flow proceeds to block 612.

At block 608, the apparatus determines an operational directive based, at least in part, on the spatial audio property, similarly as described regarding block 506 of FIG. 5. In this manner, the determination of the operational directive may be based, at least in part, on the determination that the spatial audio property is within the spatial audio property operation threshold.

At block 610, the apparatus performs one or more operations in conformance with the operational directive, similarly as described regarding block 508 of FIG. 5. In this manner, the performance of one or more operations in conformance with the operational directive may be based, at least in part, on the determination that the spatial audio property is within the spatial audio property operation threshold.

At block 612, the apparatus precludes determination of another operational directive based, at least in part, on the determination that the spatial audio property is beyond the spatial audio property operation threshold. In this manner, the preclusion of determination of another operational directive may be based, at least in part, on the determination that the spatial audio property is beyond the spatial audio property operation threshold.

Figure 7:
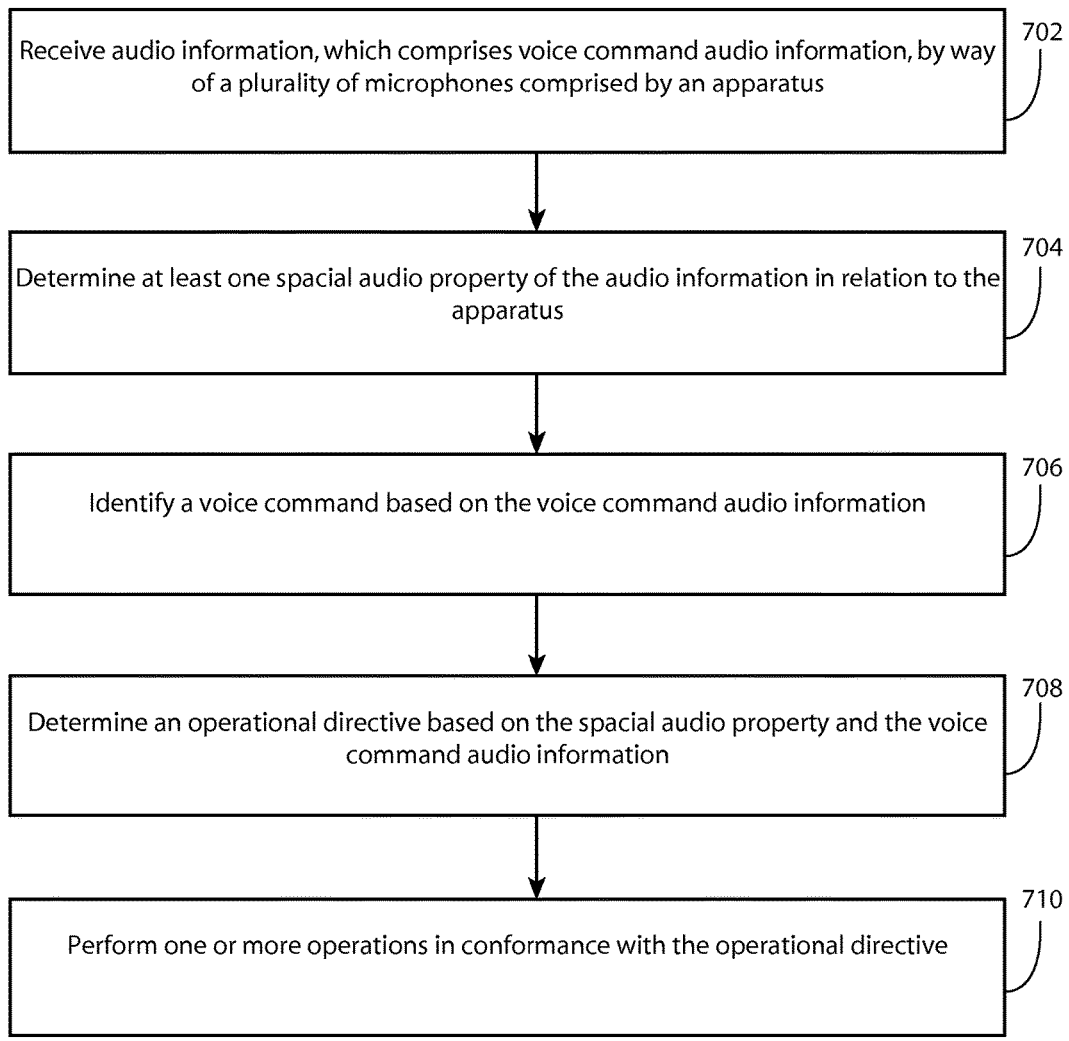
FIG. 7 is a flow diagram illustrating activities associated with determination of an operational directive based, at least in part, on the spatial audio property according to at least one example embodiment.

FIG. 7 is a flow diagram illustrating activities associated with determination of an operational directive based, at least in part, on the spatial audio property according to at least one example embodiment. In at least one example embodiment, there is a set of operations that corresponds with the activities of FIG. 7. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 7.

As previously described, it may be desirable to base an operational directive on both a spatial audio property and a voice command.

At block 702, the apparatus receives audio information, which comprises voice command audio information, by way of a plurality of microphones comprised by the apparatus. The receipt, the audio information, the voice command information, and the microphones may be similar as described regarding FIGS. 2A-2B and FIGS. 4A-4C.

At block 704, the apparatus determines at least one spatial audio property of the audio information in relation to the apparatus, similarly as described regarding block 504 of FIG. 5.

At block 706, the apparatus identifies a voice command based, at least in part, on the voice command audio information. The identification may be similar as described regarding FIGS. 4A-4C.

At block 708, the apparatus determines an operational directive based, at least in part, on the spatial audio property and the voice command. The determination and the operational directive may be similar as described regarding FIGS. 4A-4C.

At block 710, the apparatus performs one or more operations in conformance with the operational directive, similarly as described regarding block 508 of FIG. 5.

In this manner, the apparatus may determine different operational directives based, at least in part, on different spatial voice properties. Such differences in operational directives may be determined in circumstances where the voice command is the same. For example, the apparatus may receive audio information by way of a plurality of microphones comprised by the apparatus, determine at least one spatial audio property of the audio information in relation to the apparatus, determine an operational directive based, at least in part, on the spatial audio property, and perform one or more operations in conformance with the operational directive. In such an example, the apparatus may receive different audio information, which comprises other voice command audio information, by way of the plurality of microphones, determine at least one different spatial audio property of the different audio information in relation to the apparatus, the different spatial audio property being different from the spatial audio property, identify the voice command based, at least in part, on the other voice command audio information, determine a different operational directive based, at least in part, on the different spatial audio property and the voice command, and perform one or more different operations in conformance with the different operational directive.

Figure 8B:
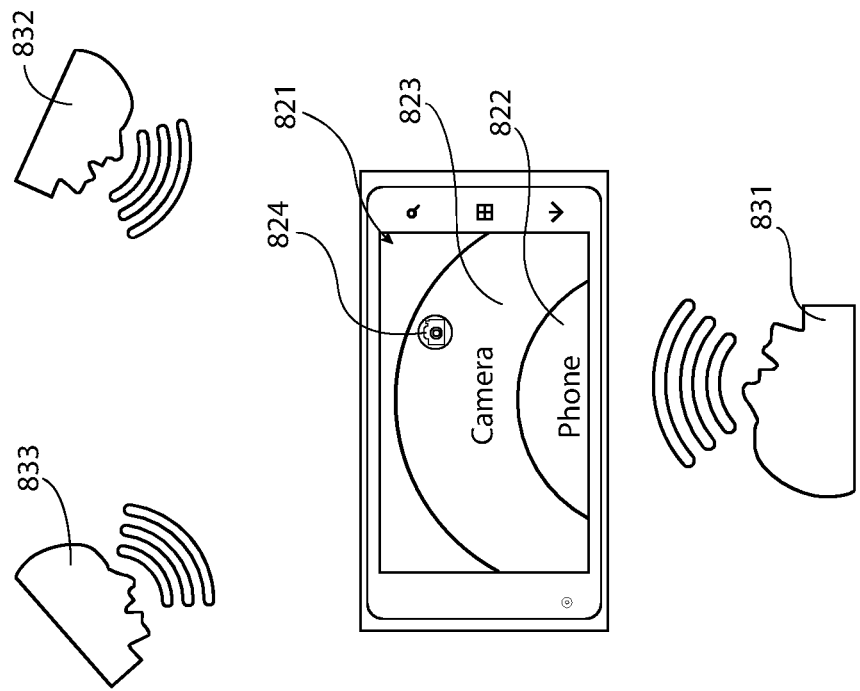
FIGS. 8A-8B are diagrams illustrating spatial audio operation indicators according to at least one example embodiment.
Figure 8A:
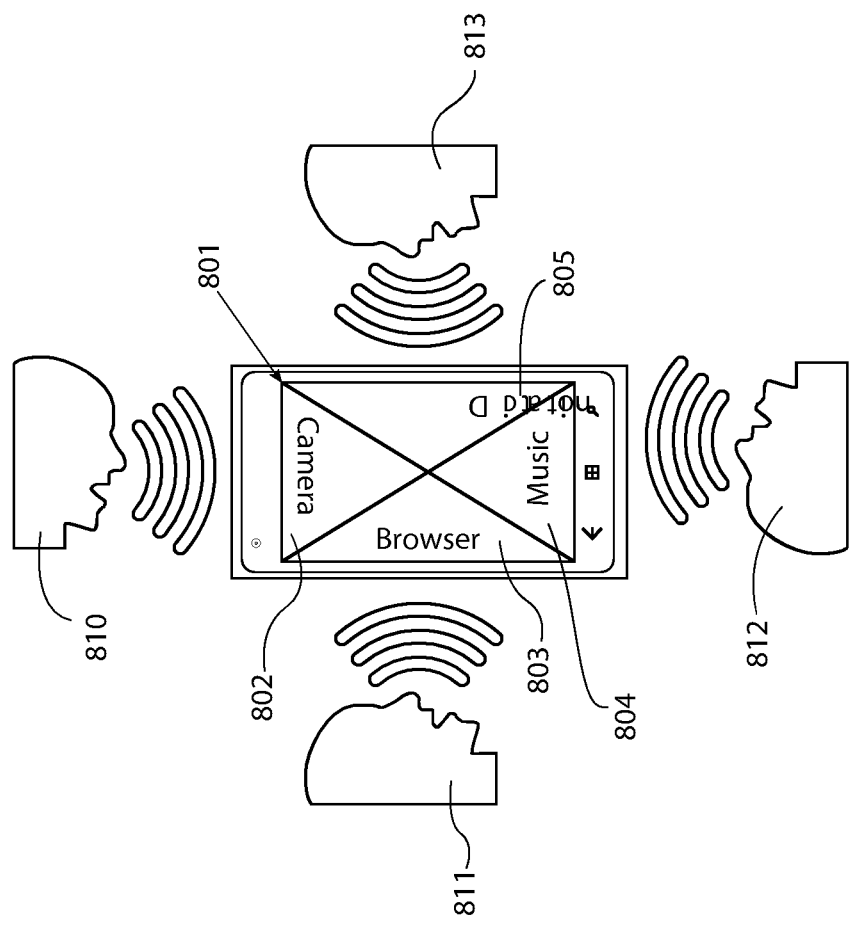

FIGS. 8A-8B are diagrams illustrating spatial audio operation indicators according to at least one example embodiment. The examples of FIGS. 8A-8B are merely examples and do not limit the scope of the claims. For example, configuration of the apparatus may vary, size of the apparatus may vary, number of microphones may vary, position of microphones may vary, orientation of microphones may vary, and/or the like.

In some circumstances, it may be desirable for the user to be able to see which program may be controlled from a particular direction or a particular distance. In such an example, it may be desirable for the apparatus to cause display of a spatial audio operation indicator. In at least one example embodiment, the spatial audio operation indicator is a visual representation of correlation between a plurality of spatial audio property ranges and a plurality of operational directive candidates. For example, the spatial audio operation indicator may visually indicate a region of the display as being associated with a particular operational directive. In such an example, the operational directive may be indicated as an operational directive candidate. In at least one example embodiment, and operational directive candidate is a visual indication of a possible operational directive that may be determined based, at least in part, on a spatial audio property that corresponds with the operation indicator.

In at least one example embodiment, the visual representation indicates a plurality of directions. In such an example, the plurality of operational directive candidates may be represented in correspondence with respective directions. In this manner, the direction associated with an operational directive candidate may correspond with an audio direction associated with the operational directive indicated by the operational directive candidate.

In at least one example embodiment, the visual representation indicates a plurality of distances. In such an example, the plurality of operational directive candidates are represented in correspondence with respective distances. In this manner, the distance associated with an operational directive candidate may correspond with an audio distance associated with the operational directive indicated by the operational directive candidate.

FIG. 8A is a diagram illustrating spatial audio operation indicators according to at least one example embodiment. In the example of FIG. 8A, spatial audio operation indicator 801 indicates operational directive candidates 802, 803, 804, and 805. It can be seen that operational directive candidate 802 corresponds with one or more camera program operation directives, that operational directive candidate 803 corresponds with one or more browser program operation directives, that operational directive candidate 804 corresponds with one or more music program operation directives, and that operational directive candidate 805 corresponds with one or more dictation program operation directives. It can be seen that the arrangement of operational directive candidate 802 with respect to the top of the apparatus indicates that audio direction 810 corresponds with a camera program operational directive, that the arrangement of operational directive candidate 803 with respect to the left of the apparatus indicates that audio direction 811 corresponds with a browser program operational directive, that the arrangement of operational directive candidate 804 with respect to the bottom of the apparatus indicates that audio direction 812 corresponds with a music program operational directive, and that the arrangement of operational directive candidate 805 with respect to the right of the apparatus indicates that audio direction 813 corresponds with a dictation program operational directive.

FIG. 8B is a diagram illustrating spatial audio operation indicators according to at least one example embodiment.

In the example of FIG. 8B, spatial audio operation indicator 821 indicates operational directive candidates 822, 823, and 824. It can be seen that operational directive candidate 822 corresponds with one or more phone program operation directives, that operational directive candidates 823 correspond with one or more camera program operation directives, and that operational directive candidates 824 correspond with a camera program capture operation directive. It can be seen that the arrangement of operational directive candidate 822 with respect to the bottom of the apparatus indicates that audio direction 831 corresponds with one or more phone program operational directive, and that the arrangement of operational directive candidate 823 with respect to the upper portion of the apparatus indicates that audio directions 832 and 833 may correspond with one or more camera program operational directive. In this manner, the apparatus may indicate proximity associated with an operational candidate. In the example of FIG. 8B, it can be seen that the bottom of operation indicator 821 identifies operational directive candidates that may be invoked from near the apparatus. In the example of FIG. 8B, audio direction 831 indicates a voice direction that is near the apparatus. In this manner, operational directive candidate 822 may be invoked by way of audio direction 831. Similarly, it can be seen that the top of operation indicator 821 identifies operational directive candidates that may be invoked from a far distance from the apparatus. In the example of FIG. 8B, audio direction 832 and audio direction 833 indicate a voice directions that are far from the apparatus. In this manner, operational directive candidate 823 may be invoked by way of audio direction 832 and/or audio direction 833.

It can be seen that operational directive candidate 824 indicates a particular direction along the edge of operational directive candidate. In this manner, the correspondence between operational directive candidate 824 and audio direction 832 indicates that audio direction 832 corresponds with the camera program capture operation directive. Similarly, absence of correspondence between operational directive candidate 823 and audio direction 832 indicates that audio direction 833 fails to correspond with the camera program capture operation directive. In this manner, spatial audio operation indicator 821 indicates that the camera program capture operation directive is precluded from audio direction 833. However, at least one other camera program operation directive may be allowed from audio direction 833.

Embodiments of the invention may be implemented in software, hardware, application logic or a combination of software, hardware, and application logic. The software, application logic and/or hardware may reside on the apparatus, a separate device, or a plurality of separate devices. If desired, part of the software, application logic and/or hardware may reside on the apparatus, part of the software, application logic and/or hardware may reside on a separate device, and part of the software, application logic and/or hardware may reside on a plurality of separate devices. In an example embodiment, the application logic, software or an instruction set is maintained on any one of various conventional computer-readable media.

If desired, the different functions discussed herein may be performed in a different order and/or concurrently with each other. For example, block 704 of FIG. 7 may be performed after block 706 of FIG. 7. Furthermore, if desired, one or more of the above-described functions may be optional or may be combined. For example, block 502 of FIG. 5 may be optional and/or combined with block 504 of FIG. 5.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are variations and modifications which may be made without departing from the scope of the present invention as defined in the appended claims.

The invention claimed is:

1. A method, comprising:
receiving, by way of a plurality of microphones comprised by an apparatus, first audio information and second audio information;
determining a frequency difference on arrival between the first audio information and the second audio information;
determining, based on the frequency difference on arrival, at least one spatial audio property of the first audio information in relation to the apparatus, wherein the at least one spatial audio property comprises an audio distance from the apparatus;
selecting, based on the audio distance and from a plurality of applications, an application; and
activating, in response to the first audio information and the second audio information, the application.

2. The method of claim 1, wherein selecting the application comprises determining that the audio distance from the apparatus is within a spatial audio property operation threshold.

3. The method of claim 2, further comprising:
receiving third audio information by way of the plurality of microphones;
determining at least one different spatial audio property of the third audio information in relation to the apparatus;
determining that the at least one different spatial audio property is beyond the spatial audio property operation threshold; and
precluding determination of an operational directive based, at least in part, on the determination that the at least one different spatial audio property is beyond the spatial audio property operation threshold.

4. The method of claim 1, wherein the first audio information comprises voice command audio information, and further comprising determining, based on the voice command audio information a voice command and an operational directive corresponding to the voice command.

5. The method of claim 4, further comprising:
receiving third audio information, which comprises other voice command audio information, by way of the plurality of microphones;
determining at least one different spatial audio property of the third audio information in relation to the apparatus, the at least one different spatial audio property being different from the spatial audio property;
determining a different operational directive based, at least in part, on the at least one different spatial audio property and the voice command; and
performing one or more operations in conformance with the different operational directive.

6. The method of claim 2, wherein the spatial audio property operation threshold is a predetermined range of spatial audio properties such that a spatial audio property within the predetermined range allows for activating the application.

7. The method of claim 2, wherein the spatial audio property operation threshold is a predetermined range of spatial audio properties such that a spatial audio property beyond the predetermined range precludes activating the application.

8. The method of claim 1, wherein the at least one spatial audio property comprises an audio direction with respect to the apparatus, the method further comprising:
   determining a security level based on the audio direction; and
   controlling display of information based on the security level.

9. The method of claim 1, further comprising causing display of a spatial audio operation indicator that is a visual representation of correlation between a plurality of spatial audio property ranges and applications of the plurality of applications.

10. An apparatus comprising at least one processor and at least one memory, the memory comprising machine-readable instructions, that when executed cause the apparatus to:
   receive, by way of a plurality of microphones comprised by the apparatus, first audio information and second audio information;
   determine a frequency difference on arrival between the first audio information and the second audio information;
   determine, based on the frequency difference on arrival, at least one spatial audio property of the first audio information in relation to the apparatus, wherein the at least one spatial audio property comprises an audio distance from the apparatus;
   select, based on the audio distance and from a plurality of applications, an application; and
   activate, in response to the first audio information and the second audio information, the application.

11. The apparatus of claim 10, wherein the at least one spatial audio property comprises an audio direction with respect to the apparatus.

12. The apparatus of claim 10, wherein the instructions that, when executed, cause the apparatus to select the application comprise instructions that, when executed, cause the apparatus to determine that the audio distance from the apparatus is within a spatial audio property operation threshold.

13. The apparatus of claim 12, wherein the instructions, when executed, further cause the apparatus to:
   receive third audio information by way of the plurality of microphones;
   determine at least one different spatial audio property of the third audio information in relation to the apparatus;
   determine that the at least one different spatial audio property is beyond the spatial audio property operation threshold; and
   preclude determination of an operational directive based, at least in part, on the determination that the at least one different spatial audio property is beyond the spatial audio property operation threshold.

14. The apparatus of claim 10, wherein the first audio information comprises voice command audio information, and wherein the instructions, when executed, further cause the apparatus to:
   identify a voice command based, at least in part, on the voice command audio information; and
   determine an operational directive based, at least in part, on the voice command.

15. The apparatus of claim 14, wherein the instructions, when executed, further cause the apparatus to:
   receive third audio information, which comprises other voice command audio information, by way of the plurality of microphones, wherein identifying the voice command is based, at least in part, on the other voice command audio information;
   determine at least one different spatial audio property of the third audio information in relation to the apparatus, the different spatial audio property being different from the spatial audio property;
   determine a different operational directive based, at least in part, on the at least one different spatial audio property and the voice command; and
   perform one or more operations in conformance with the different operational directive.

16. The apparatus of claim 12, wherein the spatial audio property operation threshold is a predetermined range of spatial audio properties such that a spatial audio property within the predetermined range allows for activating the application.

17. The apparatus of claim 12, wherein the spatial audio property operation threshold is a predetermined range of spatial audio properties such that a spatial audio property beyond the predetermined range precludes activating the application.

18. The apparatus of claim 10, wherein the instructions, when executed, further cause the apparatus to display a spatial audio operation indicator that is a visual representation of correlation between a plurality of spatial audio property ranges and a plurality of operational directive candidates.

19. At least one non-transitory computer readable medium comprising instructions, that, when executed by a computer, cause the computer to perform:
   receiving, by way of a plurality of microphones comprised by an apparatus, first audio information and second audio information;
   determining a frequency difference on arrival between the first audio information and the second audio information;
   determining, based on the frequency difference on arrival, at least one spatial audio property of the first audio information in relation to the apparatus, wherein the at least one spatial audio property comprises an audio distance from the apparatus;
   selecting, based on the audio distance and from a plurality of applications, an application; and
   activating, in response to the first audio information and the second audio information, the application.

* * * * *